United States Patent
Son et al.

(10) Patent No.: US 8,040,830 B2
(45) Date of Patent: Oct. 18, 2011

(54) APPARATUS AND METHOD FOR NEGOTIATING FRAME OFFSET BETWEEN BASE STATION AND RELAY STATION IN BROADBAND WIRELESS COMMUNICATION SYSTEM USING MULTI-HOP RELAY SCHEME

(75) Inventors: Jung-Je Son, Seongnam-si (KR); Hyoung-Kyu Lim, Seoul (KR); Chang-Yoon Oh, Yongin-si (KR); Sung-Jin Lee, Seoul (KR); Young-Bin Chang, Anyang-si (KR); Hyun-Jeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 878 days.

(21) Appl. No.: 12/074,318

(22) Filed: Mar. 3, 2008

(65) Prior Publication Data

US 2008/0212516 A1 Sep. 4, 2008

(30) Foreign Application Priority Data

Mar. 2, 2007 (KR) ........................ 10-2007-0020774

(51) Int. Cl.
*H04B 7/14* (2006.01)
(52) U.S. Cl. .................... 370/315; 370/252; 455/11.1
(58) Field of Classification Search .................. 370/315, 370/252; 455/11.1
See application file for complete search history.

(56) References Cited

U.S. PATENT DOCUMENTS

| 6,965,568 | B1 | 11/2005 | Larsen | |
|---|---|---|---|---|
| 2002/0051425 | A1 | 5/2002 | Larsson | |
| 2005/0014464 | A1 | 1/2005 | Larsson | |
| 2008/0045145 | A1* | 2/2008 | Nakatsugawa | 455/11.1 |
| 2008/0056172 | A1* | 3/2008 | Nakatsugawa | 370/315 |
| 2008/0165699 | A1* | 7/2008 | Wei | 370/252 |
| 2008/0181167 | A1* | 7/2008 | Sydir et al. | 370/315 |
| 2008/0267110 | A1* | 10/2008 | Cai et al. | 370/315 |

OTHER PUBLICATIONS

International Search Report issued on May 30, 2008 in International Patent Application No. PCT/KR2008/001195.

* cited by examiner

*Primary Examiner* — Albert T Chou

(57) ABSTRACT

Provided are an apparatus and method for negotiating a frame offset between a Base Station (BS) and a Relay Station (RS) in a wireless communication system using a multi-hop relay scheme. A communication method of a superordinate station includes, upon detecting an initial access of an relay station, determining an offset value between a frame number used in the superordinate station and a frame number to be used in the relay station; generating a message including RS frame offset information corresponding to the offset value; and transmitting the generated message to the relay station. Accordingly, since the base station and the relay station share the frame offset, the base station can transmit a specific broadcast message in advance to the relay station by considering the frame offset, and the relay station can transmit data, which has to be transmitted in synchronization with the base station at the same time point or at the same frame number, to a Mobile Station (MS) at an exact time point.

34 Claims, 13 Drawing Sheets

APPARATUS AND METHOD FOR NEGOTIATING FRAME OFFSET BETWEEN BASE STATION AND RELAY STATION IN BROADBAND WIRELESS COMMUNICATION SYSTEM USING MULTI-HOP RELAY SCHEME

CROSS-REFERENCE TO RELATED APPLICATION(S) AND CLAIM OF PRIORITY

This application claims priority under 35 U.S.C. §119(a) to a Korean patent application filed in the Korean Intellectual Property Office on Mar. 2, 2007 and assigned Serial No. 2007-20774, the entire disclosure of which is hereby incorporated by reference.

TECHNICAL FIELD OF THE INVENTION

The present invention relates to an apparatus and method for negotiating a frame offset between a base station (BS) and a relay station (RS) in a communication system using a multi-hop relay scheme. More particularly, the present invention relates to an apparatus and method in which a BS and an RS communicate by the use of a frame offset in a broadband wireless communication system using a multi-hop relay scheme.

BACKGROUND OF THE INVENTION

In the next generation communication system, also known as the 4th Generation (4G) mobile communication system, a cell has a significantly smaller radius in order to provide high-speed communication and to handle a large amount of call traffic. Currently, a wireless network is designed based on a centralized design. However, it is expected that the centralized design cannot apply to the 4G communication system. Therefore, the 4G communication system has to be controlled in a distribution manner and also has to be able to actively cope with changes in environments, for example, when a new base station (BS) is added. For the aforementioned reason, a self-configuration wireless network is required in the 4G communication system.

In order to realize the self-configuration wireless network required in the 4G communication system, a technique applied in an ad-hoc network is introduced in the wireless communication system. A representative example thereof is a multi-hop relay cellular network in which an ad-hoc multi-hop relay scheme is introduced in a cellular network which is constructed of a fixed BS.

FIG. 1 illustrates a structure of a conventional cellular network using a multi-hop relay scheme.

Referring to FIG. 1, a mobile station (MS) 110 included in a BS coverage area 101 is connected to a BS 100 with a direct link, and an MS 120 located out of the BS coverage area 101 and therefore having a poor channel state with the BS 100 is connected to the BS 100 via a relay station (RS) 130. In this case, since the RS 130 serves to relay a signal between the BS 100 and the MS 120, a BS-MS link, a BS-RS link, and an RS-MS link are formed. For example, when an MS is located in a cell edge of the BS 100 or in a shadow area suffering a serious shielding phenomenon due to buildings, the MS communicates with the BS 100 via the RS 130. As such, a high-speed data channel can be provided by using a multi-hop relay scheme in a cell edge region having a poor channel state, and it is also possible to expand a cell service area.

The broadband wireless access system generally provides an Internet service, a Voice over Internet Protocol (VoIP) service, a non-real time streaming service, etc. In addition, recently, a Multicast and Broadcast Service (MBS), which is a real-time broadcast service, was recognized as a new service. Advantageously, the MBS can provide bidirectional data communication and also support the same mobility as a Digital Multimedia Broadcasting (DMB) service. The MBS can provide a video broadcast service (e.g., news, soap opera, sports, etc.) and a data service (e.g., radio music broadcast, real time traffic information, etc.).

According to a service access method of an MS, the MBS is classified into two categories, that is, a single-BS access method and a multi-BS access method. In the single-BS access method, the MS receives an MBS service from one BS to which the MS is registered. In the multi-BS access method, the MB receives the MBS service simultaneously from two or more base stations.

FIG. 2 illustrates a multi-BS access method.

In the multi-BS access method, when an MS is located in an overlay area between a currently serving cell and a neighboring cell, a signal of the neighboring cell dose not act as noise caused by interference but acts as a signal gain resulted from radio frequency (RF) combining. This is a macro diversity effect. In order to obtain the macro diversity effect, the same signal is transmitted from a serving BS and a BS located in the neighboring cell. Therefore, to provide the MBS, all base stations and all relay stations exiting within a broadcast zone (i.e., MBS_ZONE) transmit the same signal.

When a BS has data (e.g., MBS data) to be transmitted at a specific time point, the BS considers a processing delay which occurs in an RS, and thus transmits the data to the RS before the specific time point. By doing so, even when the RS experiences the processing delay, for example, to analyze the received data or to allocate a bandwidth for retransmission, the BS and the RS can transmit the same data at the same time point.

For example, when the data is transmitted through two-hops, the BS transmits the data in advance by considering not only a first-hop RS but also a second-hop RS. In this case, in consideration of the processing delay occurring in the second-hop RS, the first-hop RS directly connected to the BS buffers the data, and transmits the data to the MS at a predetermined time point.

Meanwhile, the broadband wireless communication system may cause interference in UpLink (UL) communication when neighboring base stations use the same frame number at the same time point. For this reason, in order to increase a system capacity or coverage, the neighboring base stations need to use different frame numbers from one another. The same also apply to a system using a relay scheme. Hence, it is preferable that base stations and relay stations use different frame numbers at the same time point. In this case, if a frame number cannot be differentiated between a BS and an RS, a problem may occur in which a message to be transmitted at the same time point or at the same frame number is transmitted by the BS and the RS at a different time point or at a different frame number. Therefore, when the different frame number is used between the BS and the RS, there is a need for a signaling process capable of negotiating a frame offset between the BS and the RS.

SUMMARY OF THE INVENTION

To address the above-discussed deficiencies of the prior art, it is a primary object of the present invention to address at least the above-mentioned problems and/or disadvantages and to provide at least the advantages described below. Accordingly, an aspect of the present invention is to provide an apparatus and method for negotiating a frame offset between a base station (BS) and a relay station (RS) in a communication system using a multi-hop relay scheme.

Another aspect of the present invention is to provide an apparatus and method for determining a transmission time point of broadcast service data by using a frame offset between a BS and an RS in a communication system using a multi-hop relay scheme.

Another aspect of the present invention is to provide an apparatus and method for determining a transmission time point of a specific control message by using a frame offset between a BS and an RS in a communication system using a multi-hop relay scheme.

Another aspect of the present invention is to provide an apparatus and method in which a BS Transmission (Tx) frame number is used to inform a transmission time point of broadcast service data transmitted by an RS in a communication system using a multi-hop relay scheme.

Another aspect of the present invention is to provide an apparatus and method in which an RS Tx frame number is used to inform a transmission time point of a specific control message transmitted by an RS in a communication system using a multi-hop relay scheme.

According to an aspect of the present invention, a communication method of a superordinate station in a wireless communication system using a multi-hop relay scheme is provided. The method includes, upon detecting an initial access of an RS, determining an offset value between a frame number used in the superordinate station and a frame number to be used in the RS; generating a message including RS frame offset information corresponding to the offset value; and transmitting the generated message to the RS.

According to another aspect of the present invention, a communication method of an RS in a wireless communication system using a multi-hop relay scheme is provided. The method includes, during an initial access of the RS, receiving a message including RS frame offset information that indicates an offset value between a frame number used in a superordinate station and a frame number to be used in the RS; and determining a frame number of the RS by using the RS frame offset.

According to another aspect of the present invention, a communication method of a superordinate station in a wireless communication system using a multi-hop relay scheme is provided. The method includes, upon detecting an initial access of an RS, determining an offset value between a frame number used in the superordinate station and a frame number to be used in the RS; determining a maximum waiting time by considering processing delay times of all relay stations including the connected RS; determining a waiting time of the RS by using the maximum waiting time; generating a message which includes RS frame offset information corresponding to the offset value and also includes information on the waiting time; and transmitting the generated message to the RS.

According to another aspect of the present invention, a communication method of an RS in a wireless communication system using a multi-hop relay scheme is provided. The method includes, during an initial access of the RS, receiving a message which includes RS frame offset information indicating an offset value between a frame number used in a superordinate station and a frame number to be used in the RS and which also includes RS waiting time information for a specific broadcast message; and determining a frame number of the RS by using the RS frame offset.

According to another aspect of the present invention, a superordinate station apparatus in a wireless communication system using a multi-hop relay scheme is provided. The apparatus includes a controller for, upon detecting an initial access of an RS, determining an offset value between a frame number used in the superordinate station and a frame number to be used in the RS; a message processor for generating a message including RS frame offset information corresponding to the offset value; and a transmitter for transmitting the generated message to the RS.

According to another aspect of the present invention, an RS apparatus in a wireless communication system using a multi-hop relay scheme is provided. The apparatus includes a message processor for, during an initial access of the RS, receiving a message including RS frame offset information that indicates an offset value between a frame number used in a superordinate station and a frame number to be used in the RS; and a controller for determining a frame number of the RS by using the RS frame offset.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

Figure 1:
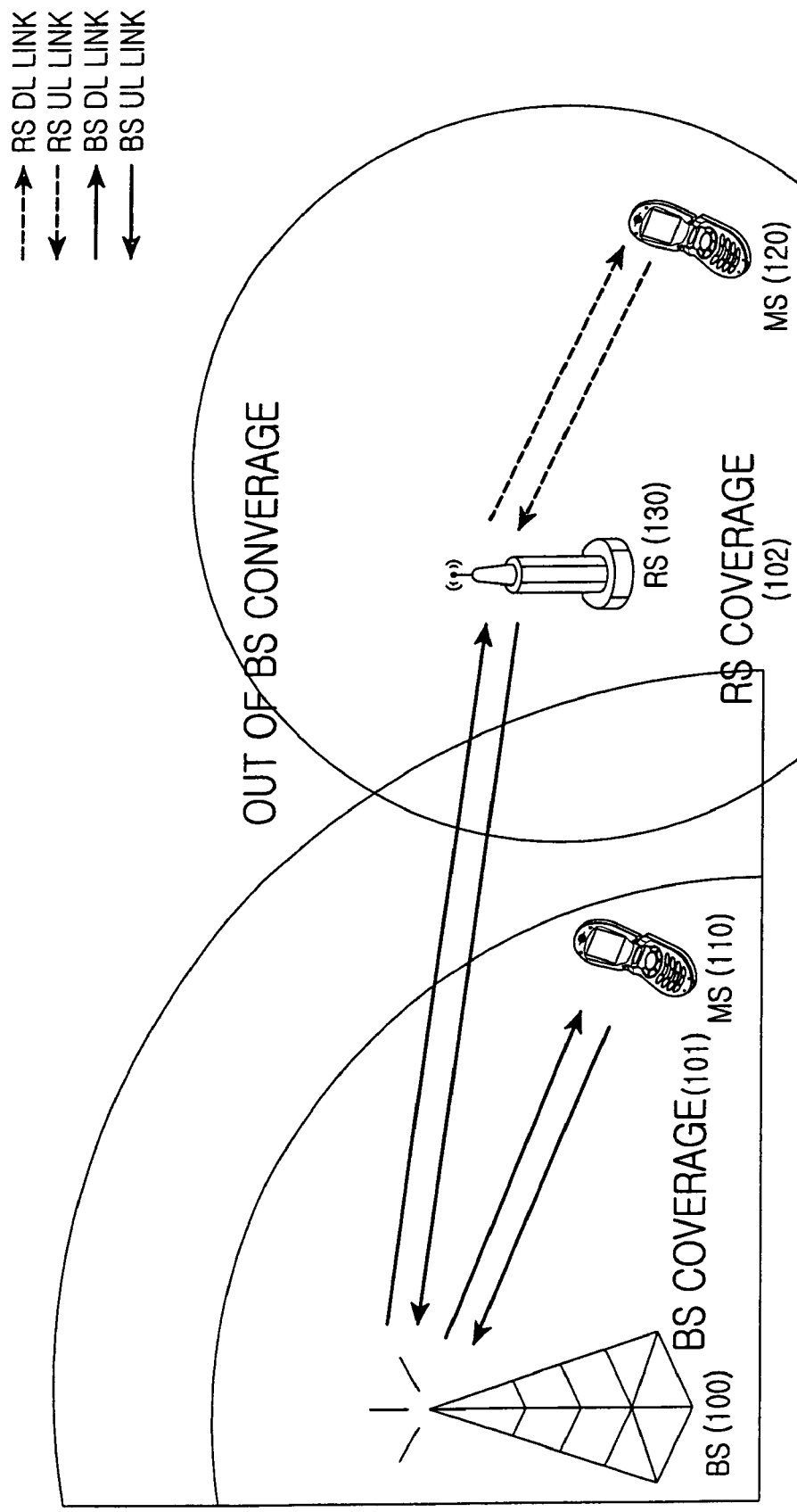
FIG. 1 illustrates a structure of a conventional cellular network using a multi-hop relay scheme.
Figure 2:
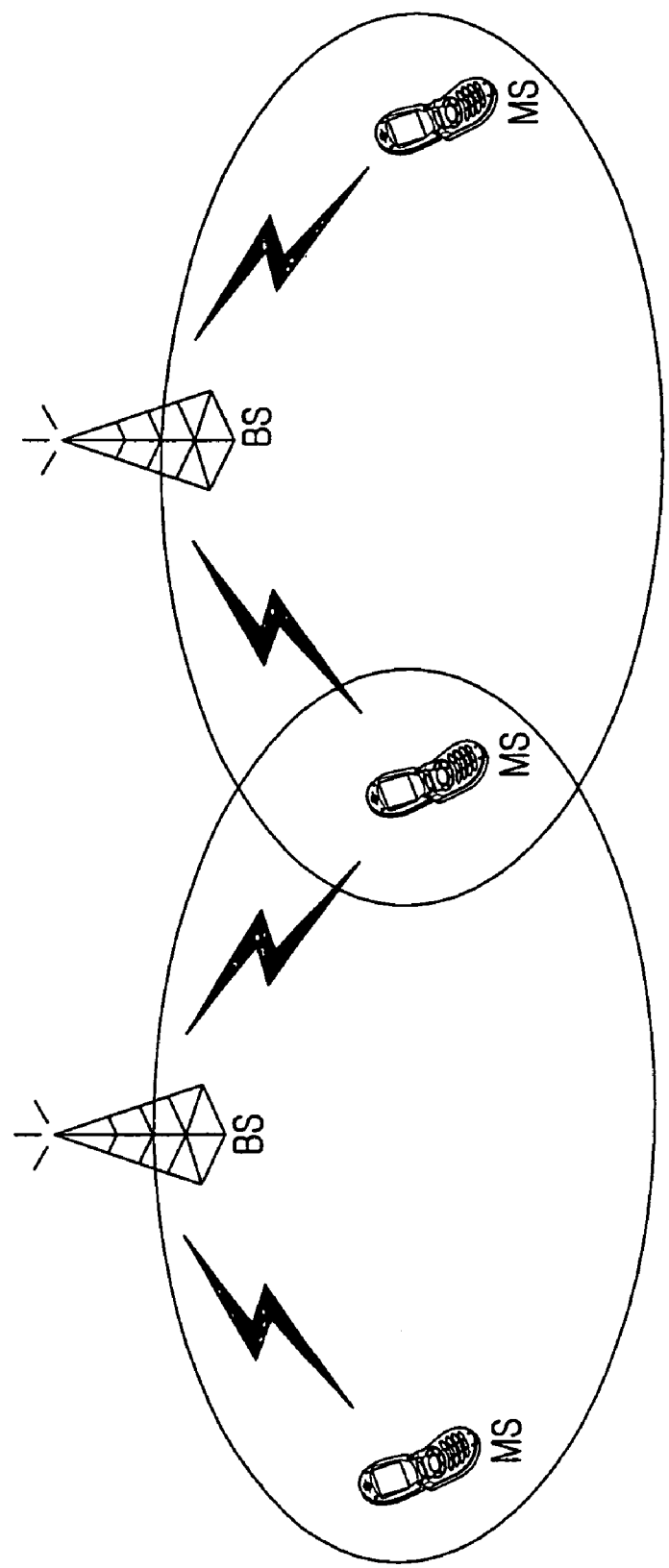
FIG. 2 illustrates a multi-Base Station (BS) access method.

FIGS. 2 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Hereinafter, a technique of the present invention will be described which negotiates a frame offset between a base station (BS) and a relay station (RS) in a broadband wireless communication system using a multi-hop relay scheme. That is, according to the present invention, the BS and the RS negotiate the frame offset, and thereafter the BS transmits a specific message to the RS by considering the frame offset, and the RS determines a transmission time point of the specific message by using the frame offset.

A broadband wireless access communication system using a multi-hop relay scheme may use an Orthogonal Frequency Division Multiplexing (OFDM) and Orthogonal Frequency Division Multiple Access (OFDMA) method. Since the broadband wireless access communication system using the multi-hop relay scheme uses the OFDM/OFDMA method, high-speed data communication is possible when a physical channel signal is transmitted by using a plurality of sub-carriers. In addition, a mobility of a Mobile Station (MS) can be supported in a multi-cell structure.

Although the broadband wireless access communication system is hereinafter described as an example, the present invention may also apply to other cellular-based communication systems as long as the multi-hop relay scheme is used.

During an initial access of an RS, a BS determines a frame number of the connected RS by considering frame numbers of other relay stations, and informs the RS of a difference (i.e., frame offset) between a Least Significant Bit (LSB) 8-bit value of a BS frame number and an LSB 8-bit value of an RS frame number. That is, during an initial access procedure, the BS and the RS negotiate the frame offset and thus share the frame offset. As such, the BS may determine a start frame number of the RS. Alternatively, the RS may check frame numbers of neighboring base stations and relay stations, select a desired frame offset value, and request the BS to inform the frame offset value. When the RS transmits to the BS a request message including information on the frame offset determined by the RS, the BS may permit the requested value or may re-determine the frame offset before responding to the RS.

For example, the frame offset value may be negotiated by using a Subscriber station Basis Capability negotiation-REQuest-ReSPonse (SBC-REQ-RSP) message or a REGistration-REQuest-ReSPonse (REG-REQ-RSP) message. In this case, a Type-Length-Value (TLV) parameter is added to the SBC-REQ-RSP message or the REQ-REQ-RSP message, and an example thereof is shown in Table 1 below.

TABLE 1

| Name | Length | Value | Scope |
|---|---|---|---|
| RS frame offset | 1 byte | Unsigned integer for frame offset of LSB 8 bit between Relay Station and Base Station | |

In this case, a size (i.e., bit size) of frame offset information may be 16 bits according to a system configuration. However, another bit size may also be used.

When a subordinate RS is newly registered to an RS which is registered to a BS, the BS or the superordinate RS may inform the subordinate RS of a difference (i.e., frame offset) between an LBS 8-bit value of the superordinate RS frame number and an LBS 8-bit value of the subordinate RS frame number. If the superordinate RS informs the subordinate RS of the frame offset, the superordinate RS informs the BS of this value. That is, the BS manages frame offsets of all relay stations belonging to the BS.

When there is data (i.e., Multicast and Broadcast Service (MBS) data) to be transmitted at a specific time point by both the BS and the RS, the BS reports a BS Transmission (Tx) frame number for the data when the data is transmitted to the RS.

An example of a TLV parameter for informing the BS Tx frame number is shown in Table 2 below.

TABLE 2

| Name | Length | Value | Scope |
|---|---|---|---|
| BS Tx frame number | 1 byte | Unsigned integer for LSB 8 bit of frame number at which BS shall transmit | |

Upon receiving information as shown in Table 2 above, the RS determines a transmission time point by using a known frame offset and the BS Tx frame number. For example, if the frame offset is 8, and the BS Tx frame number is 10, then the RS transmits the data at a frame number 18.

A message transmitted by both the BS and the RS may be either a message transmitted at the same physical time point or a message transmitted at the same frame number. For example, the message may be a TRaFfic INDication (TRF-IND) message which is transmitted in a sleep mode or a PAGing ADVertisement (PAG-ADV) message which is transmitted in an idle mode. In this case, the BS also reports an RS Tx frame number when the message is transmitted to the RS.

An example of a TLV parameter for informing the RS Tx frame number is shown in Table 3 below.

TABLE 3

| Name | Length | Value | Scope |
|---|---|---|---|
| RS Tx frame number | 1 byte | Unsigned integer for LSB 8 bit of frame number at which RS shall transmit | |

Upon receiving information as shown in Table 3 above, the RS transmits a message at a frame corresponding to the RS Tx frame number. In this case, the BS uses processing delay times and frame numbers of a plurality of relay stations, and thus delivers the message to the RS in advance so as to minimize a waiting time for the message in the RS.

For example, assume that a frame offset of a first RS registered to the BS is 10, a frame offset of a second RS is 15, a processing delay time of each RS is 3 frames, and the BS transmits a message (i.e., TRF-IND message or PAG-ADV message) at a frame number 10.

In this case, in order to minimize a delay time occurring in the relay stations, when an RS start frame number is 10, the BS may transmit the message to the first RS at a time point earlier by 13 frames and to the second RS at a time point earlier by 18 frames. Now, it will be assumed that the BS transmits the message to the relay stations at a BS frame number 5 without knowing or considering a frame offset of each subordinate RS. Then, the first RS may receive the message from the BS at a frame number 15, and transmit the message at a frame number 18 when a processing delay time is considered. However, since the message has to be transmitted at a frame number 10, the RS waits about more than 250 frames to transmit the message. That is, when the BS arbitrarily transmits the data without considering the frame offset, a waiting time may be excessively prolonged in the RS in some cases. Therefore, it is assumed in the present invention that the BS transmits the message by considering the frame offset between the BS and the RS when the BS transmits to the RS the message to be transmitted at the same time point or at the same frame number.

When the BS and the RS share an RS frame offset, the BS and the RS may first negotiate an RS waiting time W_i_offset in advance. Thereafter, the RS may determine a message transmission time point by using the waiting time.

For example, when a BS, an RS1, an RS2, and an RS 3 each use a different frame number, assume that a frame offset of the RS1 is 1, a frame offset of the RS2 is 2, and a frame offset of the RS3 is 3. It is also assumed that the RS1 and the RS3 are subordinate relay stations of the BS, and the RS2 is a subordinate RS of the RS1. That is, the RS2 receives data from the BS via the RS1, and the BS receives data from the RS2 via the RS1. In addition, it is assumed that the relay stations each have the same RS processing delay time R_D equal to 3 frames.

In this case, in order for the BS and the relay stations to transmit the same message at the same frame number, the BS transmits a message at a time point earlier by (R_D+1 frame) to the RS1, at a time point earlier by (R_D+R_D+2 frames) to the RS2, and at a time point earlier by (R_D+3 frames) to the RS3. That is, when the message is transmitted at a time point earlier by 9 frames to the relay stations, each RS can transmit the message at a predetermined frame number by processing the message during the RS processing delay time R_D.

In this case, a waiting time required by each RS to transmit a message is 4 frames for the RS1, 0 frame for the RS2, and 2 frames for the RS3.

The aforementioned description can be generalized as follows.

A BS transmits a message at a time point earlier at least by (MAX_R_D+RS frame offset_MAX_R_D). That is, the BS transmits the message to relay stations at a time point earlier by a value obtained by summing a maximum processing delay time and a frame offset of an RS having the maximum delay time. The summation value will be defined as a maximum waiting time $MAX_{13}$ W_i_offset.

Thus, a waiting time W_i_offset, during which each RS waits for transmission of a message, is determined by (MAX_W_i_offset−R_D−frame offset).

During the initial access procedure, the superordinate station and the RS negotiate and share the RS frame offset, the RS processing delay time R_D, and the waiting time W_i_offset. The superordinate station may be a BS or a superordinate RS. When a new RS is connected and thus the aforementioned values change, the changed values need to be informed to each RS. By using such a method, there is no need to additionally provide transmission-related information (i.e., transmission frame information) when a TRF-IND message or a PAG-ADV message is transmitted, thereby reducing an overhead. The RS frame offset and the RS waiting time may be negotiated by using a message (e.g., SBC-RSP, RS Configuration CoManD (RS_Config-CMD), etc.) which is exchanged during the initial access procedure as described above.

Figure 3:
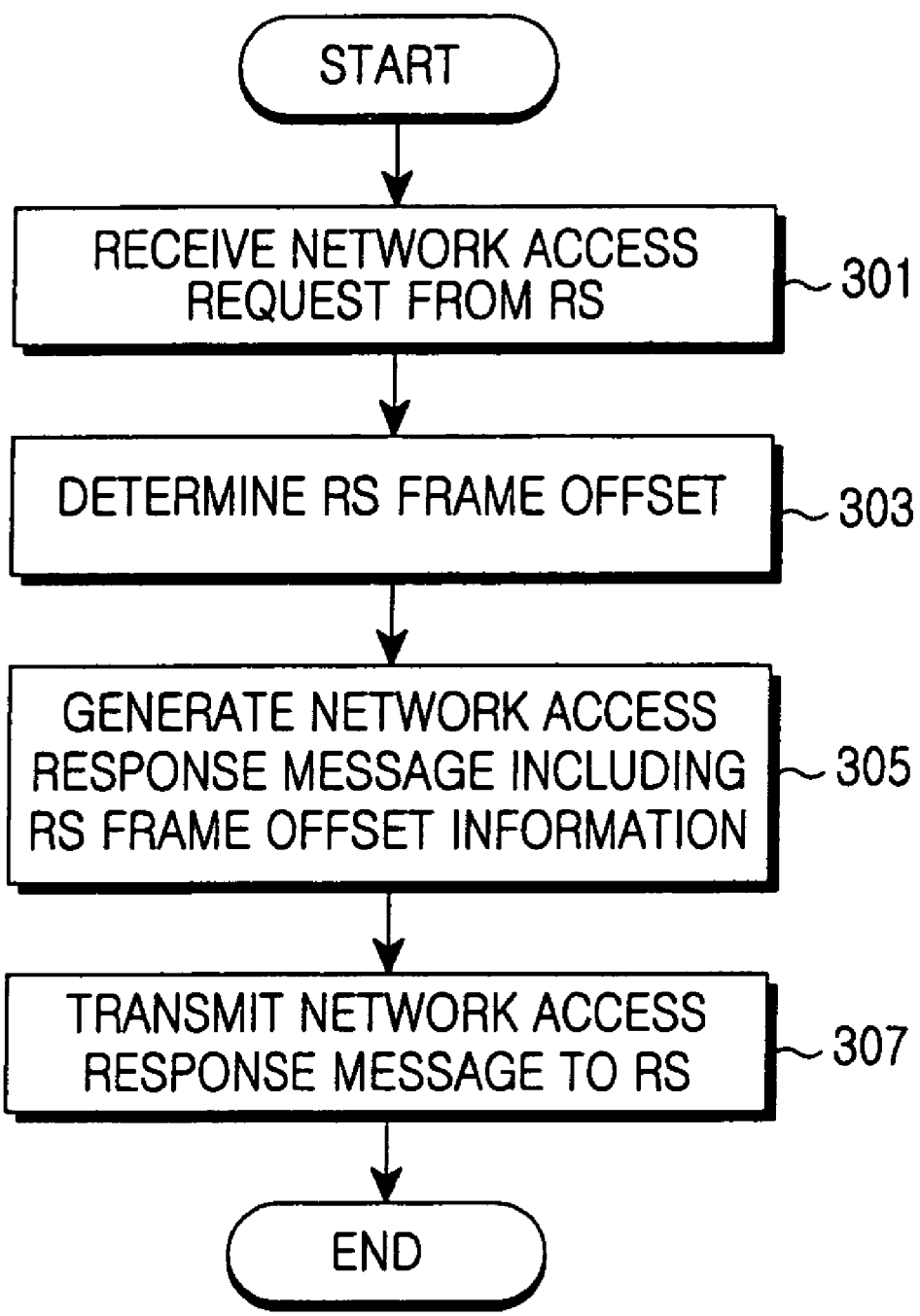
FIG. 3 is a flowchart illustrating a process of negotiating a Relay Station (RS) frame offset, performed by a BS (or superordinate station), in a broadband wireless communication system using a multi-hop relay scheme according to the present invention.

FIG. 3 is a flowchart illustrating a process of negotiating an RS frame offset, performed by a BS or a superordinate station (i.e., a higher-order station), in a broadband wireless communication system using a multi-hop relay scheme according to the present invention.

Referring to FIG. 3, the BS or superordinate station receives an access request from an RS in step 301. In general, an initial access procedure (or network entry procedure) is performed by a ranging operation, a basic capability negotiation operation, an authentication operation, a registration operation, etc. That is, the BS and the RS can perform traffic communication after establishing connection through the initial access procedure. Meanwhile, during the initial access procedure, the RS may request the BS or superordinate station to inform a specific frame offset.

As such, upon detecting an initial access of an arbitrary RS, the BS determines a frame offset to be allocated to the connected RS by using frame offsets of a plurality of relay stations managed by the BS in step 303. The frame offset represents an offset value between a frame number used in the superordinate station of the RS and a frame number to be used by the RS.

In step 305, the BS generates a message including information on the determined frame offset. In step 307, the BS transmits the message including the frame offset information to the RS. The message is one of messages which are transmitted to the RS while the initial access procedure is performed. For example, the message maybe an SBC-RSP message, an RS_Config-CMD message, etc. The RS frame offset information may be included in a TLV format as shown in Table 1 above.

Figure 4:
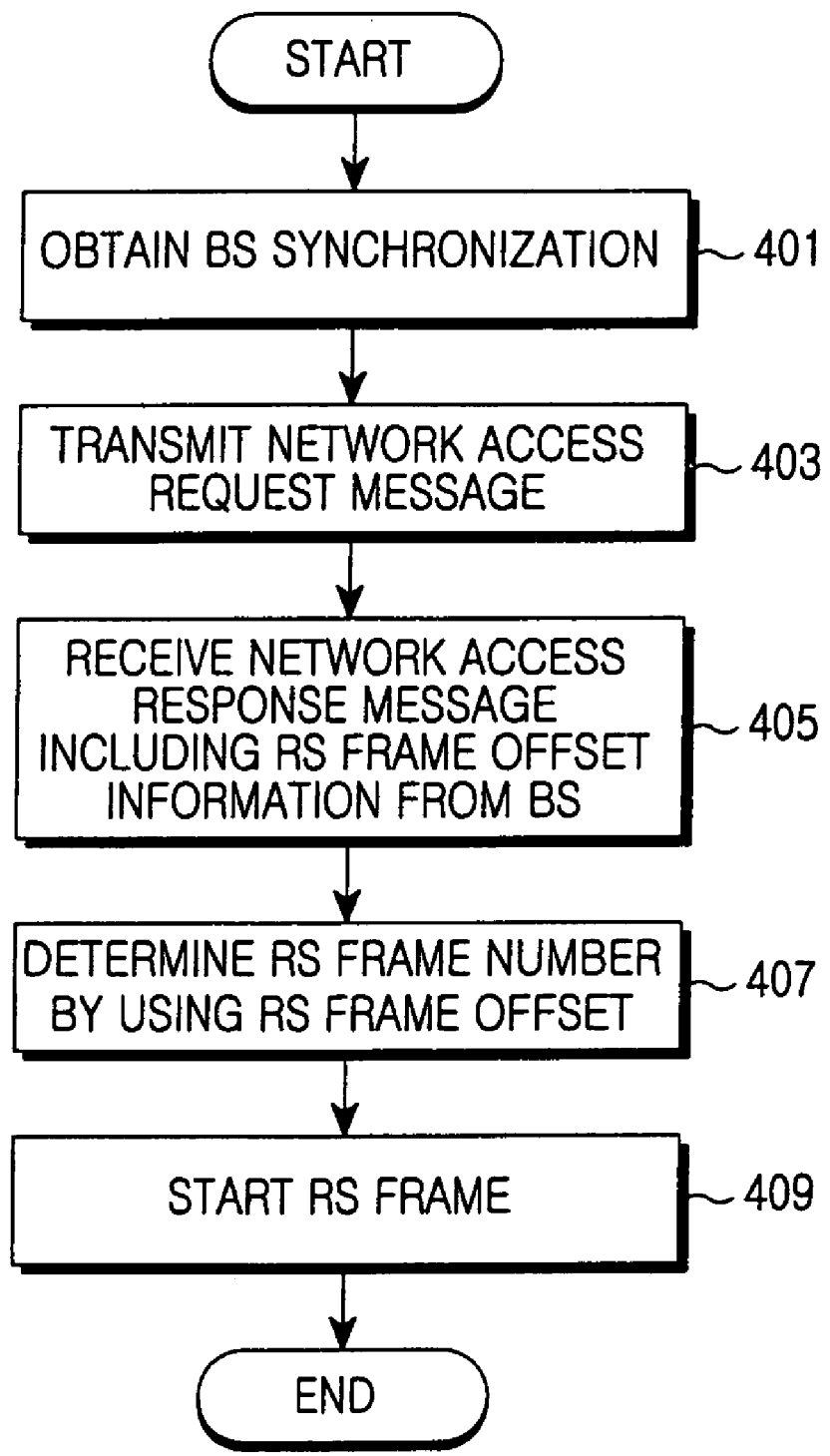
FIG. 4 is a flowchart illustrating a process of negotiating a frame offset, performed by an RS, in a broadband wireless communication system using a multi-hop relay scheme according to the present invention.

FIG. 4 is a flowchart illustrating a process of negotiating a frame offset, performed by an RS, in a broadband wireless communication system using a multi-hop relay scheme according to the present invention.

Referring to FIG. 4, during an initial access procedure, the RS receives a preamble signal from a BS or a superordinate station and thus obtains system synchronization in step 401. Further, the RS receives a Downlink Channel Descriptor (DCD) message and an Uplink Channel Descriptor (UCD)

message from the BS or superordinate station and thus obtains parameters required for communication. For example, the RS obtains a parameter related to initial raging by using the UCD message. After obtaining the parameter related to the initial ranging, the RS attempts the initial ranging and thus performs the initial access procedure (or network entry procedure).

During the initial access procedure, the RS transmits to the BS an access request for negotiating a frame offset in step 403. The access request message may be an SBC-REQ message or an REG-REQ message. In this case, the RS may request the BS to inform a specific frame offset.

During the initial access procedure, the RS receives from the superordinate station a message including RS frame offset information which indicates an offset value between a frame number of the superordinate station and a frame number of the RS in step 405. The message including the RS frame offset information may be an SBC-RSP message, a REG-RSP message, or an RS_Config-CMD message. The RS frame offset information may be included in the TLV format as shown in Table 1 above.

In step 407, the RS extracts the frame offset information from the message, and determines a frame number by using the frame offset information. In step 409, the RS starts frame communication on the basis of the determined frame number.

Figure 5:
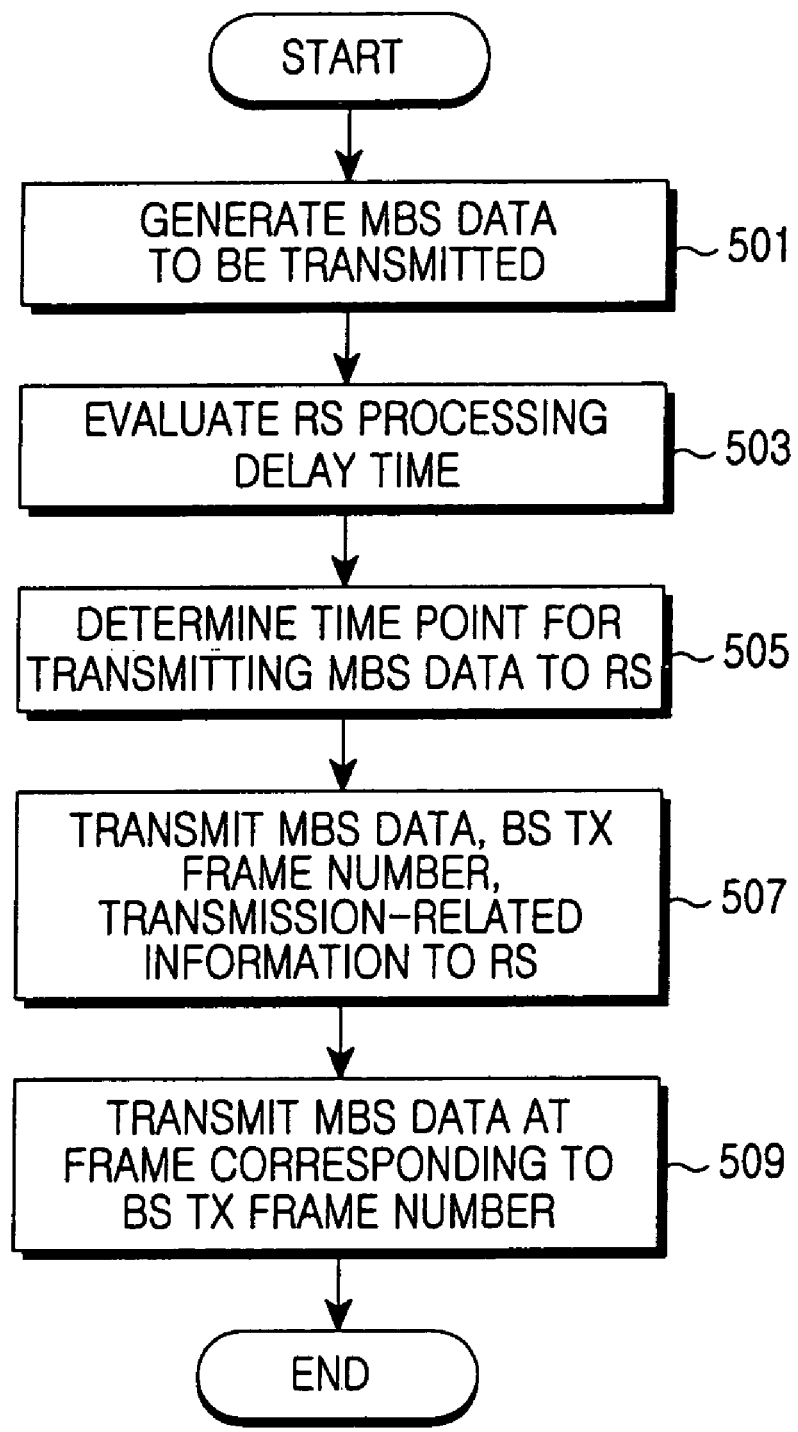
FIG. 5 is a flowchart illustrating a process of transmitting broadcast service data, performed by a BS, in a broadband wireless communication system using a multi-hop relay scheme according to the present invention.

FIG. 5 is a flowchart illustrating a process of transmitting broadcast service data, performed by a BS, in a broadband wireless communication system using a multi-hop relay scheme according to the present invention.

Referring to FIG. 5, the BS receives MBS data (or MBS packet) through a network in step 501. Upon receiving the MBS data, the BS evaluates RS frame offsets and RS processing delay times R_D of a plurality of relay stations in step 503.

In step 505, by considering the RS processing delay time R_D of each RS, the BS determines a transmission time point for transmitting the MBS to the relay stations. For example, the BS may select a maximum value among the process delay times R_D of the relay stations, and determine the transmission time point to be a frame corresponding to a time point earlier by the selected value from a BS Tx frame number.

In step 507, the BS transmits the MBS data to the relay stations at the determined frame. In this step, the BS Tx frame number, at which the MBS data is transmitted, and information related to the MBS transmission (e.g., air scheduling information) are also transmitted together with the MBS data.

In step 509, the BS transmits the MBS data to a plurality of mobile stations at a frame corresponding to the BS Tx frame number.

Figure 6:
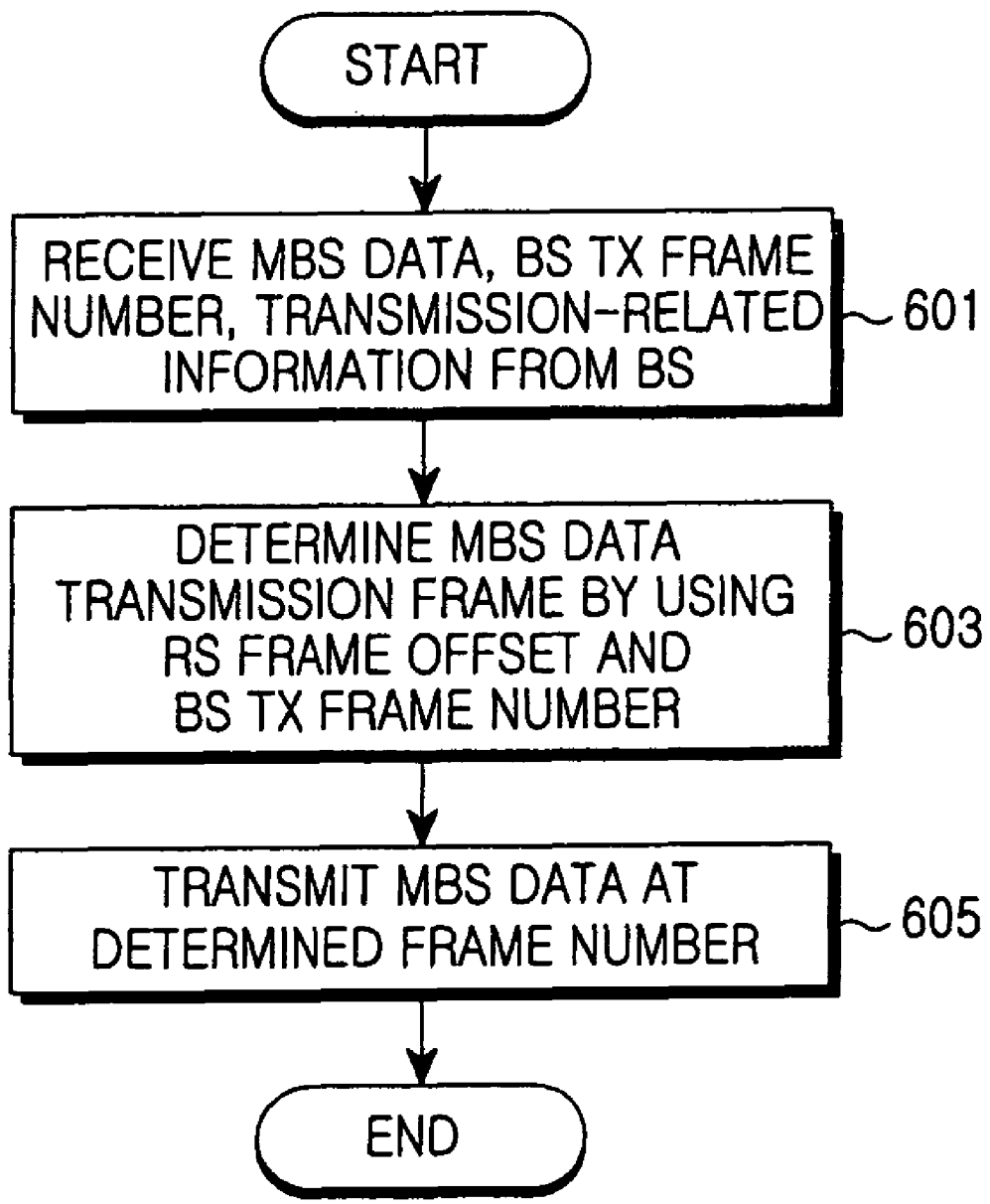
FIG. 6 is a flowchart illustrating a process of transmitting broadcast service data, performed by an RS, in a broadband wireless communication system using a multi-hop relay scheme according to the present invention.

FIG. 6 is a flowchart illustrating a process of transmitting broadcast service data, performed by an RS, in a broadband wireless communication system using a multi-hop relay scheme according to the present invention.

Referring to FIG. 6, the RS receives MBS data from a BS in step 601. In addition to the MBS data, the RS also receives a BS Tx frame number, at which the MBS data is transmitted, and MBS transmission-related information (e.g., air scheduling information).

In step 603, the RS determines a frame number, at which the MBS data is transmitted to a plurality of mobile stations, by using a previously negotiated RS frame offset and the received BS Tx frame number. For example, if the frame offset is 8, and the BS Tx frame number is 10, the RS sets a transmission time point to a frame number 18.

In step 605, the RS transmits the MBS data to the mobile stations at a frame corresponding to the determined frame number.

Figure 7:
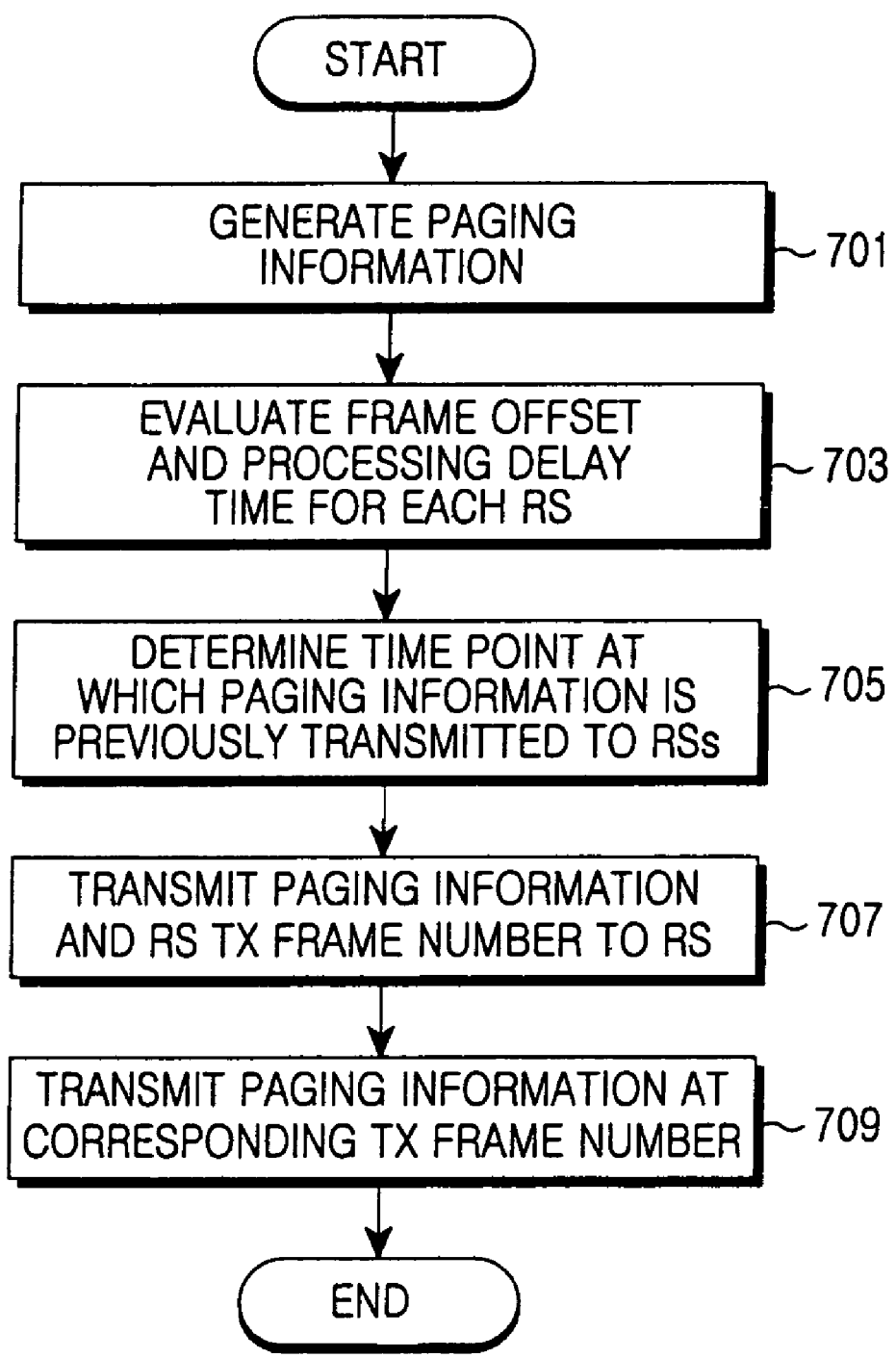
FIG. 7 is a flowchart illustrating a process of transmitting a specific control message, performed by a BS, in a broadband wireless communication system using a multi-hop relay scheme according to the present invention.

FIG. 7 is a flowchart illustrating a process of transmitting a specific control message, performed by a BS, in a broadband wireless communication system using a multi-hop relay scheme according to the present invention.

Referring to FIG. 7, the BS determines whether paging information is generated in step 701. The paging information may be a TRF-IND message which is transmitted in a sleep mode, a PAG-ADV message which is transmitted in an idle mode, or the like.

In step 703, the BS evaluates RS frame offsets and RS processing delay times R_D of a plurality of relay stations. In step 705, the BS determines a time point (or frame), at which the paging information is transmitted to the RS, by using the evaluated RS frame offsets and the RS processing delay times R_D.

For example, assume that a frame offset of a first RS registered to the BS is 10, a frame offset of a second RS is 15, a processing delay time of each RS is 3 frames, and the BS transmits a message (i.e., TRF-IND message or PAG-ADV message) at a frame number 10. In this case, the BS transmits the message at a time point earlier by 13 frames to the first RS and at a time point earlier by 18 frames to the second RS. Therefore, the transmission time point is determined to be a time point earlier by 18 frames.

In step 707, the BS transmits the paging information to the relay stations at the determined frame. In this step, an RS Tx frame number is also transmitted together with the paging information.

In step 709, the BS transmits the paging information at a BS Tx frame number, which is previously determined through scheduling, to a plurality of mobile stations at a corresponding frame.

Figure 8:
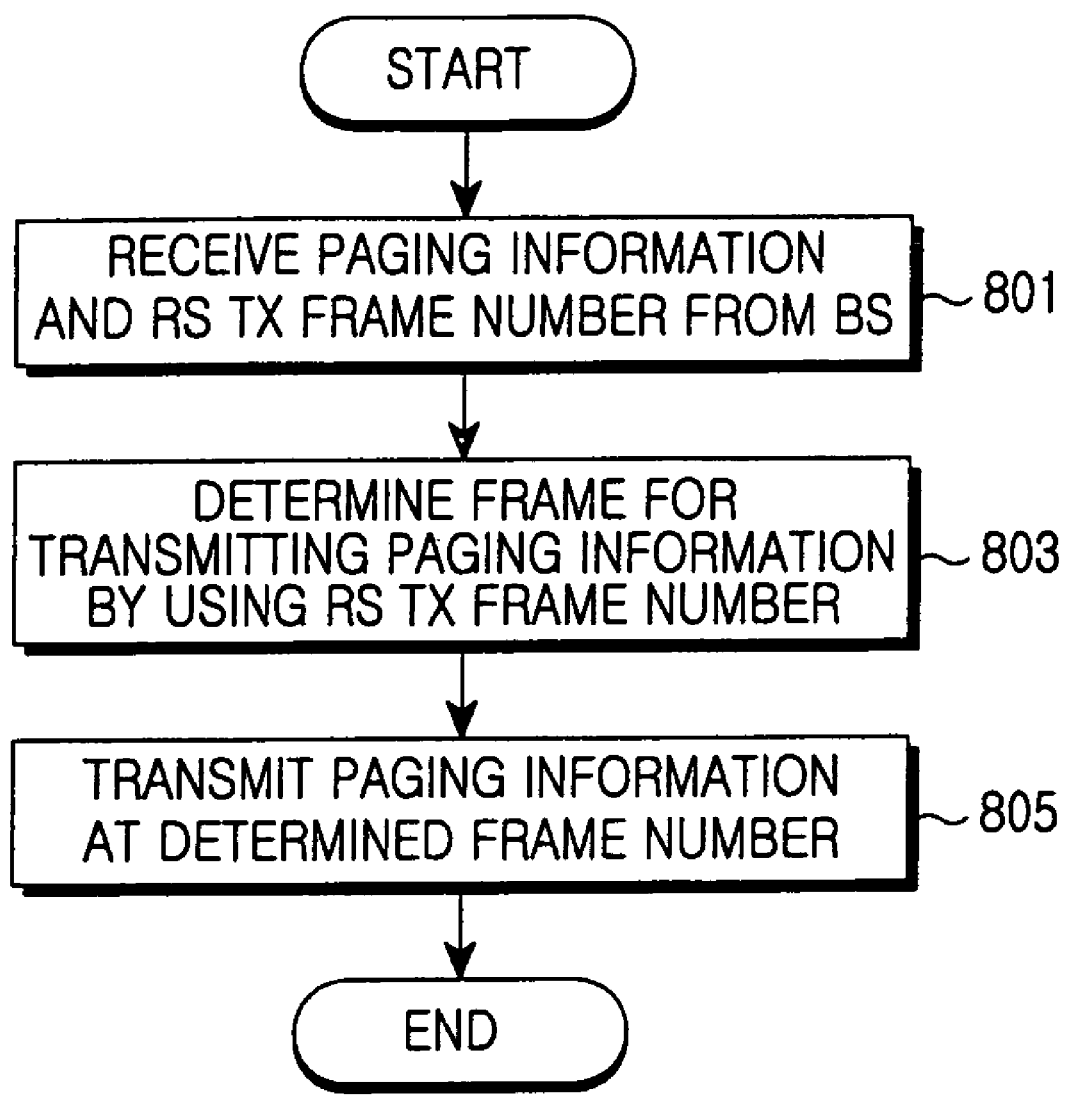
FIG. 8 is a flowchart illustrating a process of transmitting a specific control message, performed by an RS, in a broadband wireless communication system using a multi-hop relay scheme according to the present invention.

FIG. 8 is a flowchart illustrating a process of transmitting a specific control message, performed by an RS, in a broadband wireless communication system using a multi-hop relay scheme according to the present invention.

Referring to FIG. 8, the RS receives paging information from a BS in step 801. In this step, in addition to the paging information, the RS also receives an RS Tx frame number at which the paging information is transmitted. The paging information may be a TRF-IND message which is transmitted in a sleep mode, a PAG-ADV message which is transmitted in an idle mode, or the like.

In step 803, the RS determines a frame number, at which the paging information is transmitted, by using the received RS Tx frame number. In step 805, the RS transmits the paging information to a plurality of mobile stations at a frame corresponding to the determined frame number.

Figure 9:
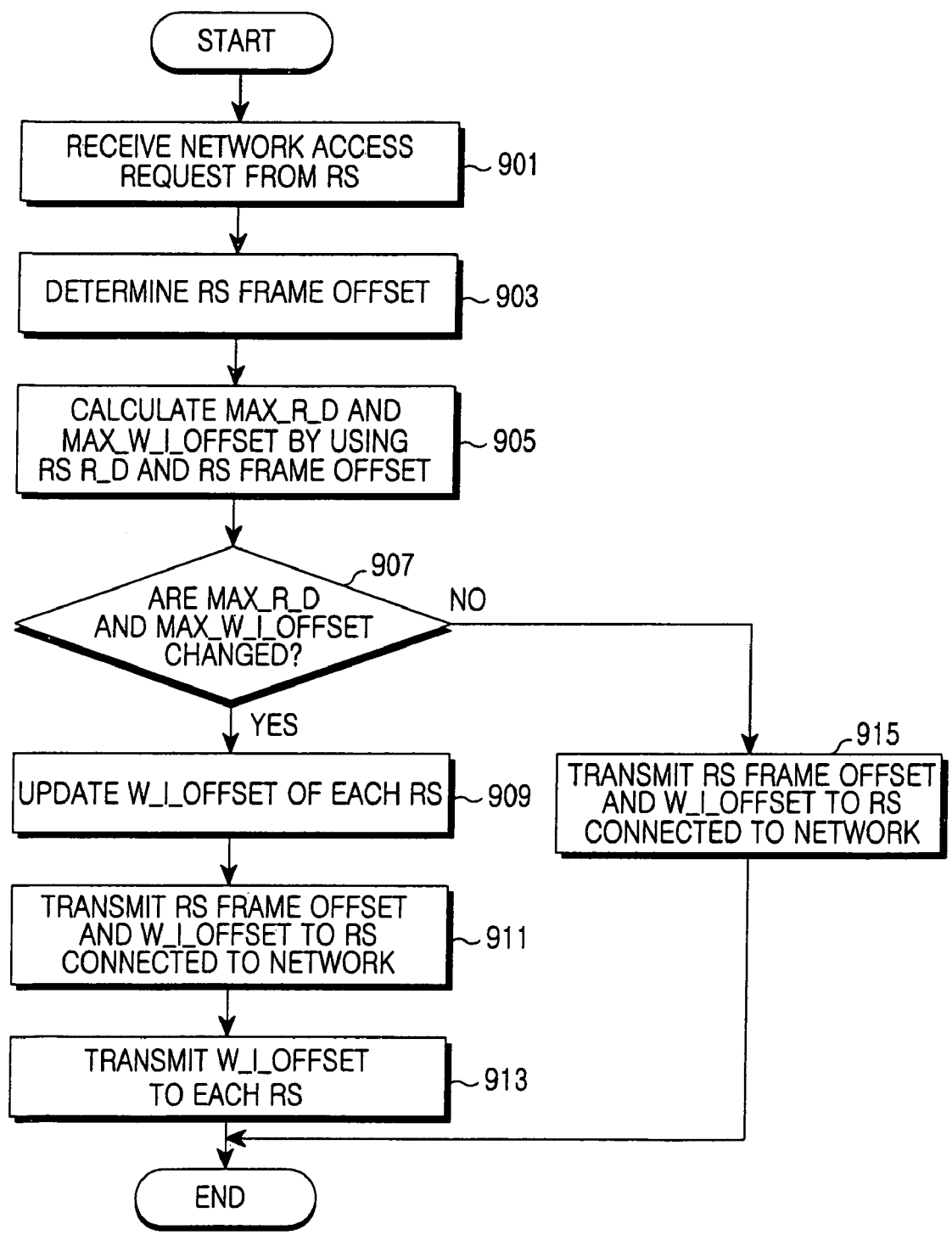
FIG. 9 is a flowchart illustrating a process of negotiating a frame offset, performed by a BS (or superordinate station), in a broadband wireless communication system using a multi-hop relay scheme according to the present invention.

FIG. 9 is a flowchart illustrating a process of negotiating a frame offset, performed by a BS or superordinate station, in a broadband wireless communication system using a multi-hop relay scheme according to the present invention.

Referring to FIG. 9, the BS or superordinate station receives an access request from an RS in step 901. In general, an initial access procedure or a network entry procedure is performed by a ranging operation, a basic capability negotiation operation, an authentication operation, a registration operation, etc. That is, the BS and the RS can perform traffic communication after establishing connection through the initial access procedure. Meanwhile, during the initial access procedure, the RS may request the superordinate station to inform a specific frame offset.

As such, upon detecting an initial access of an RS, the BS (or superordinate station) determines a frame offset to be allocated to the connected RS by using frame offsets of a plurality of relay stations managed by the BS in step 903. The frame offset represents an offset value between a frame number used in the BS (or superordinate station) and a frame number to be used by the RS.

In step 905, the BS (or superordinate station) selects a maximum processing delay time MAX_R_D among processing delay times of all relay stations including the connected RS, and calculates a maximum waiting time MAX_W_i_offset by summing the maximum processing delay time MAX_R_D and a frame offset of a corresponding RS.

In step 907, the BS determines whether the maximum processing delay time MAX_R_D and the maximum waiting time MAX_W_i_offset have changed due to an access of a new RS. If there is no change, proceeding to step 915, the BS calculates a waiting time W_i_offset of the connected RS, and transmits to the RS a message including RS frame offset information and W_i_offset information. The message is one of messages transmitted to the RS during the initial access procedure. For example, the message may be an SBC-RSP message or an RS_Config-CMD message.

If there are changes in the maximum processing delay time and the maximum waiting time, proceeding to step 909, the BS updates the waiting time $W_{13}$ i_offset with respect to all relay stations which are currently being connected to the network. Herein, the waiting time W_i_offset is calculated according to (MAX_W_i_offset−R_D−frame offset).

In step 911, the BS transmits to the connected RS a message including the RS frame offset information and the W_i_offset information. In step 913, the BS reports the updated waiting time W_i_offset to the remaining relay stations.

Figure 10:
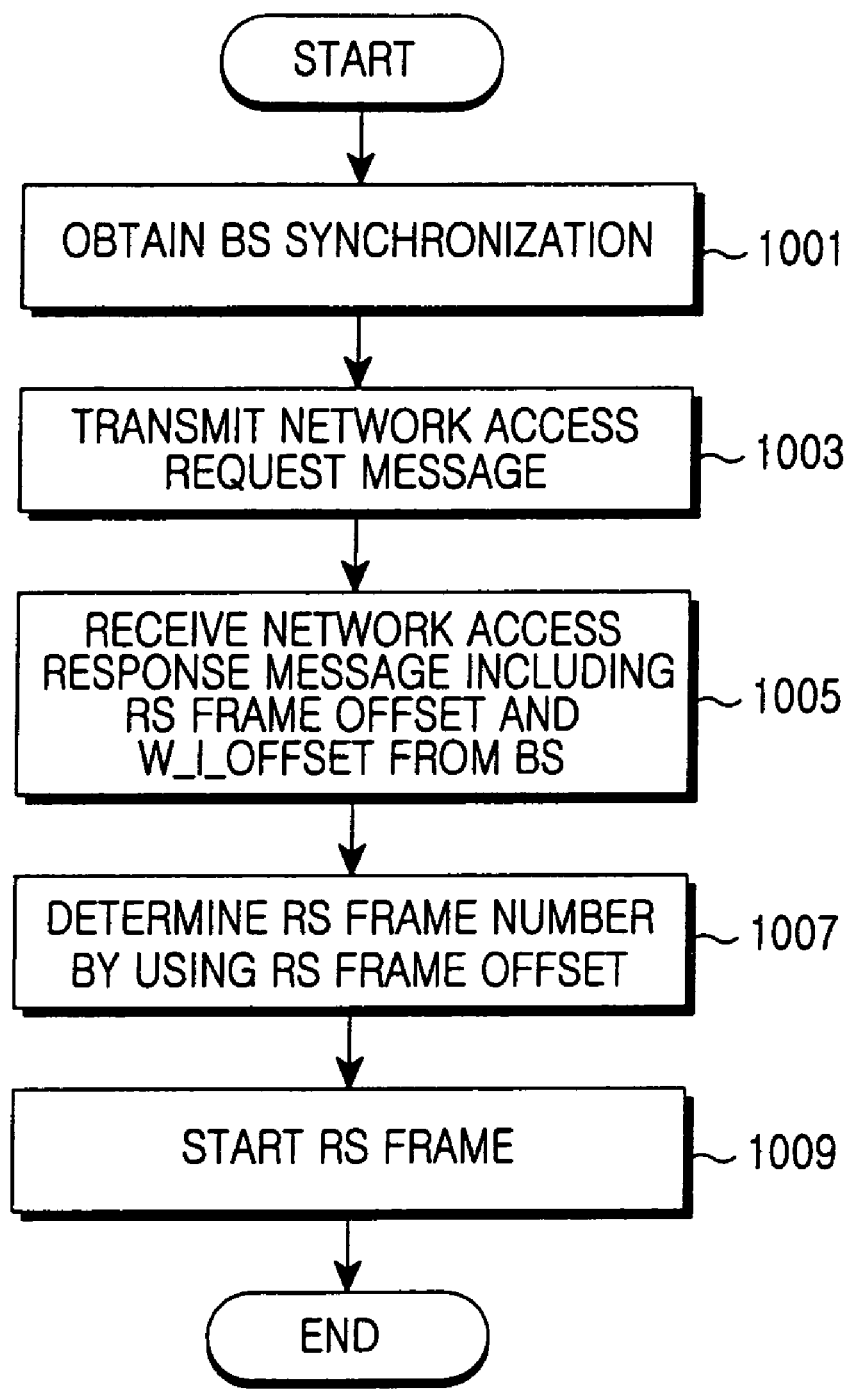
FIG. 10 is a flowchart illustrating a process of negotiating a frame offset, performed by an RS, in a broadband wireless communication system using a multi-hop relay scheme according to the present invention.

FIG. 10 is a flowchart illustrating a process of negotiating a frame offset, performed by an RS, in a broadband wireless communication system using a multi-hop relay scheme according to the present invention.

Referring to FIG. 10, during an initial access procedure, the RS receives a preamble signal from a BS or a superordinate station and thus obtains system synchronization in step 1001. Further, the RS receives a DCD message and a UCD message from the BS and thus obtains parameters required for communication. For example, the RS obtains a parameter related to initial ranging by using the UCD message. After obtaining the parameter related to the initial ranging, the RS starts the initial ranging and thus performs the initial access procedure (or network entry procedure).

During the initial access procedure, the RS transmits an access request for negotiating a frame offset to the BS in step 1003. The access request message may be an SBC-REQ message or an REG-REQ message. In this case, the RS may request the BS to provide a specific frame offset.

During the initial access procedure, the RS receives from the BS (or superordinate station) a message including RS frame offset information and W_i_offset information in step 1005. The message including the RS frame offset information and the W_i_offset information may be an SBC-RSP message, a REG-RSP message, or an RS_Config-CMD message. The RS frame offset information and the W_i_offset information may be added in the TLV format as shown in Table 1 above. The W_i_offset information may be transmitted by using the same message together with the RS frame offset information. Alternatively, the W_i_offset information may be transmitted by using another message separately from the RS frame offset information.

In step 1007, the RS extracts the RS frame offset information from the received message, and determines a frame number by using the RS frame offset information. In step 1009, the RS starts frame communication on the basis of the determined frame number.

Figure 11:
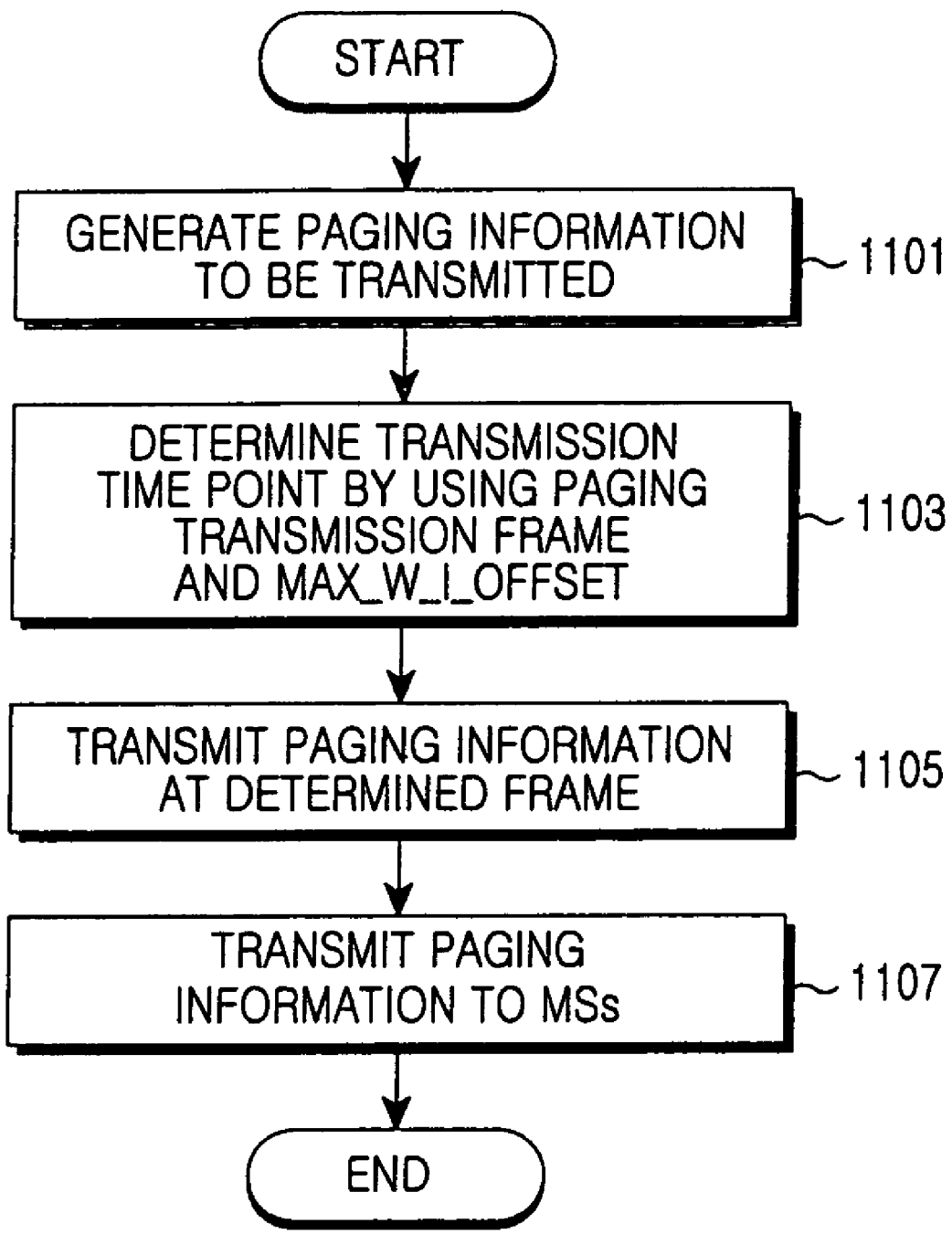
FIG. 11 is a flowchart illustrating a process of transmitting a specific control message, performed by a BS, in a broadband wireless communication system using a multi-hop relay scheme according to the present invention.

FIG. 11 is a flowchart illustrating a process of transmitting a specific control message, performed by a BS, in a broadband wireless communication system using a multi-hop relay scheme according to the present invention.

Referring to FIG. 11, the BS determines whether paging information is generated in step 1101. The paging information may be a TRF-IND message which is transmitted in a sleep mode, a PAG-ADV message which is transmitted in an idle mode, or the like.

In step 1103, the BS determines a time point (or frame), at which the paging information is transmitted to a plurality of relay stations, by using a BS Tx frame number, at which the paging information is transmitted to a plurality of mobile stations, and also by using a predetermined maximum waiting time MAX_W_i_offset. That is, a transmission time point is determined to be a frame corresponding to a time point earlier by the maximum waiting time from the BS Tx frame number.

In step 1105, the BS transmits the paging information to the relay stations at the determined frame. In step 1107, the BS transmits the BS Tx frame number, which is previously determined through scheduling, to a plurality of mobile stations at a corresponding frame.

Figure 12:
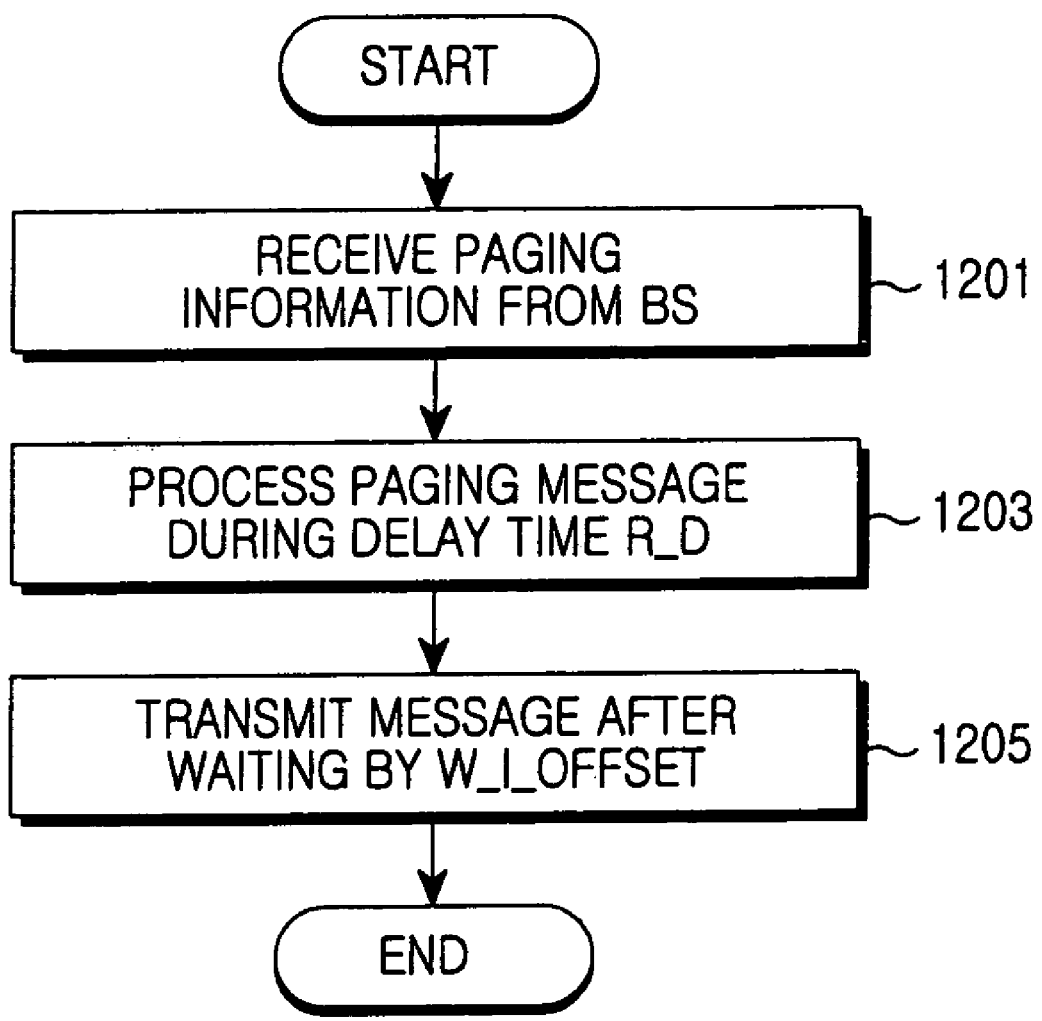
FIG. 12 is a flowchart illustrating a process of transmitting a specific control message, performed by an RS, in a broadband wireless communication system using a multi-hop relay scheme according to the present invention.

FIG. 12 is a flowchart illustrating a process of transmitting a specific control message, performed by an RS, in a broadband wireless communication system using a multi-hop relay scheme according to the present invention.

Referring to FIG. 12, the RS receives paging information from a BS in step 1201. The paging information may be a TRF-IND message which is transmitted in a sleep mode, a PAG-ADV message which is transmitted in an idle mode, or the like.

In step 1203, the RS processes the paging information during an RS processing delay time R_D. In step 1205, the RS waits for a waiting time W_i_offset which is previously negotiated with the BS, and then transmits the paging information to a plurality of mobile stations.

Figure 13:
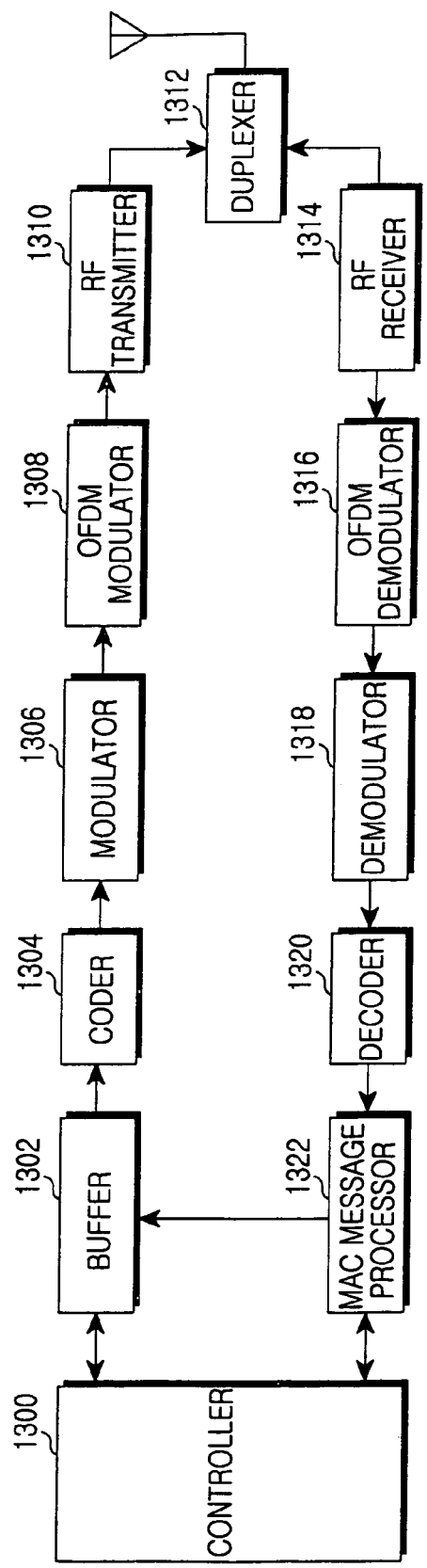
FIG. 13 is a block diagram of a BS (or RS) according to the present invention.

FIG. 13 is a block diagram of a BS (or RS) according to the present invention. Since the BS and the RS have the same structure when they have the same interface module (or communication module), operations of the BS and the RS will hereinafter be described with reference to the apparatus of FIG. 13. In addition, a Time Division Duplex (TDD)-OFDM system is assumed to be used in the following description. However, the present invention is not limited thereto, and thus may also apply to a hybrid system using both a TDD scheme and a Frequency Division Duplex (FDD) scheme or a cellular-based system using a different resource division scheme.

Referring to FIG. 13, the BS (or RS) includes a controller 1300, a buffer 1302, a coder 1304, a modulator 1306, an OFDM modulator 1308, a Radio Frequency (RF) transmitter 1310, a duplexer 1312, an RF receiver 1314, an OFDM demodulator 1316, a demodulator 1318, a decoder 1320, and a Media Access Control (MAC) message processor 1322.

The duplexer 1312 receives a signal from the RF transmitter 1310 through an antenna according to a duplex mode, and provides the signal received from the antenna to the RF receiver 1314. For example, in a TDD mode, the duplexer 1312 transmits a signal received from the RF transmitter 1310 through the antenna in a transmission frame, and delvers the signal received through the antenna to the RS receiver 1314 in a reception frame.

The buffer 1302 inputs and outputs data under the control of the controller 1300, and buffers a traffic and control message (e.g., MAC Protocol Data Units (PDUs)) to be transmitted. It is assumed that unicast traffic, MBS traffic, and a control message (i.e., MAC management message) are all buffered in the buffer 1302.

The coder 1304 codes a packet (i.e., an MBS packet or a control message) received from the buffer 1302 according to a predetermined coding method. The modulator 1306 modulates data output from the coder 1304 according to a predetermined modulation method. The OFDM modulator 1308 performs an Inverse Fast Fourier Transform (IFFT) operation on the data received from the modulator 1306 and thus outputs sample data (i.e., OFDM symbol). The RF transmitter 1310 converts the sample data provided from the OFDM modulator 1308 into an analog signal, converts the analog signal into an RF signal, and transmits the RF signal through the antenna.

The RF receiver 1314 converts an RF signal received from the duplexer 1312 into a baseband signal. The OFDM demodulator 1316 performs a Fast Fourier Transform (FFT) operation on the baseband sample data received from the RF receiver 1314 and thus outputs frequency-domain data. In this case, the OFDM demodulator 1316 sorts the frequency-domain data in the unit of burst to which a Modulation and Coding Scheme (MCS) level is applied.

The demodulator 1318 demodulates the data received from the OFDM demodulator 1316 according to a predetermined demodulation method. The decoder 1320 decodes the data received from the demodulator 1318 according to a predetermined decoding method. In this manner, a physical-layer decoding is performed. The physical-layer decoded data is processed after being classified into a data packet and a control packet.

The MAC message processor 1322 receives data from a superordinate layer or a superordinate station, generates a MAC PDU (i.e., traffic and control message) to be transmitted, and provides the generated MAC PDU to the buffer 1302. Further, the MAC message processor 1322 extracts the MAC PDU from the data received from the decoder 1320, and performs header and error checking on the extracted MAC PDU. If the data is determined as the control message (i.e., signaling message) as a result of the header checking, the MAC message processor 1322 extracts various control messages from the control message and provides the extracted messages to the controller 1300. Further, the MAC message processor 1322 generates the control message under the control of the controller 1300 and provides the generated message to the buffer 1302.

The controller 1300 performs a predetermined process on information output from the MAC message processor 1322, generates information to be transmitted, and provides the generated information to the MAC message processor 1322. Further, the controller 1300 receives information required during a protocol proceeding operation from a physical layer component or generates a control signal by using the physical layer component. It is assumed herein that resource scheduling is performed by the controller 1300.

Now, the operations of the BS and the RS according to the present invention will be described with reference to FIG. 13. The following description will focus on a process performed in a MAC layer.

The operation of the BS (or superordinate station) will now be described. The MAC message processor 1322 analyzes the control message output from the decoder 1320, and provides the result to the controller 1300. The controller 1300 detects an initial access of the RS by using the message analysis result obtained from the MAC message processor 1322. If the initial access of the RS is detected, the controller 1300 determines a frame offset (or both a frame offset and a waiting time W_i_offset) to be allocated to the RS, and provides the determination result to the MAC message processor 1322.

Then, the MAC message processor 1322 generates a message, which includes the frame offset (or both the frame offset and the waiting time) output from the controller 1300, and provides the generated message to the buffer 1302. The buffer 1302 outputs the message to a physical layer component under the control of the controller 1300. The message including the frame offset information is physical-layer encoded and is then transmitted to a corresponding RS. As such, the BS (or superordinate station) and the RS negotiate the frame offset (or both the frame offset and the waiting time) during the initial access procedure.

In addition, the MAC message processor 1322 generates a message (e.g., MBS data) which is transmitted by both the BS and the RS at the same time point and a message (e.g., paging information) which is transmitted by both the BS and the RS at the same frame number, and provides the generated messages to the buffer 1302. As for the MBS data, a BS Tx frame number (or BS frame number) and transmission-related information (i.e., air scheduling information) are generated together with the MBS data, and are provided to the buffer 1302. As for the paging information, an RS Tx frame number is also generated and is then provided to the buffer 1302. The MBS data, the BS Tx frame number, and the transmission-related information may be combined into one packet and be provided to the buffer 1302, or may be formed into different packets and be provided to the buffer 1302.

The controller 1300 determines a time point, at which the data (i.e., MBS data or the paging information) loaded in the buffer 1302 is transmitted to the RS, by using at least one of the BS Tx frame number, the RS processing delay time R_D, the RS frame offset, and the maximum waiting time MAX_W_i_offset. Further, the controller 1300 controls the output of the message (or packet) loaded in the buffer 1302 according to the determined time point. The packet output from the buffer 1302 is physical-layer encoded and is then transmitted to the RS. The MBS data and the paging information are multicast or broadcast to a plurality of mobile stations at a frame corresponding to a predetermined frame number.

The operation of the RS will now be described. The MAC message processor 1322 analyzes the control message output from the decoder 1320, and provides the result to the controller 1300. When a specific message (e.g., SBC-RSP message or RS_Config-CMD message) is received from the BS, the MAC message processor 1322 extracts the RS frame offset (or both the frame offset and the waiting time W_i_offset) from the received message, and provides the extraction result to the controller 1300. Then, the controller 1300 determines the RS frame number by using the RS frame offset. As such, the BS and the RS negotiate the frame offset (or both the frame offset and the waiting time) during the initial access procedure.

Further, the MAC message processor 1322 deals with the data (i.e., MBS data or paging information) received from the BS, and loads the data into the buffer 1302 so as to transmit the data to another RS or an MS. In this case, additional information (i.e., BS Tx frame number or RS TX frame number) is received together with the MBS data, and is provided to the controller 1300. Then, the controller 1300 determines a transmission time point of the data (i.e., MBS data or paging information) loaded in the buffer 1302 by using the BS Tx frame number, the RS Tx frame number, or the pre-negotiated waiting time W_i_offset. Further, the controller 1300 controls the output of the message (or packet) loaded in the buffer 1302 according to the determined time point. Then, the packet output from the buffer 1302 is physical-layer encoded and is then transmitted to a plurality of mobile stations. That is, the data received from the BS is transmitted to the mobile stations at the same time point or at the same frame number in synchronization with the BS.

According to the present invention, when a BS and an RS use different frame numbers from each other in a wireless communication system using a multi-hop relay scheme, a signaling process is used to negotiate a frame offset between the BS and the RS. That is, since the BS and the RS share the frame offset, the BS can transmit a specific broadcast message in advance to the RS by considering the frame offset. Further, the RS can transmit data, which has to be transmitted in synchronization with the BS at the same time point or at the same frame number, to an MS at an exact time point.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A communication method of a superordinate station in a wireless communication system using a multi-hop relay scheme, the method comprising:
   upon detecting an initial access of a Relay Station (RS), determining an offset value between a frame number used in the superordinate station and a frame number to be used in the relay station;
   determining a maximum waiting time by considering processing delay times of all relay stations including the connected relay station;
   determining a waiting time of the relay station using the maximum waiting time;
   generating a message which includes RS frame offset information corresponding to the offset value and information on the waiting time;
   transmitting the generated message to the relay station;
   upon generating a broadcast message to be transmitted at a same frame number by both the superordinate station and the relay station, determining a transmission time point, at which the broadcast message is transmitted to the relay station, by using a transmission frame number of the broadcast message and the maximum waiting time;
   transmitting the broadcast message to the relay stations at the determined transmission time point; and
   transmitting the broadcast message to a Mobile Station (MS) at a frame corresponding to the transmission frame number.

2. The method of claim 1, wherein the broadcast message is either a TRaFfic-INDication (TRF-IND) message or a PAGing-ADVertisement (PAG-ADV) message.

3. A communication method of a relay station (RS) in a wireless communication system using a multi-hop relay scheme, the method comprising:
   during an initial access of the relay station, receiving a message which includes a RS frame offset indicating an offset value between a frame number used in a superordinate station and a frame number to be used in the relay station and RS waiting time information for a specific broadcast message; and
   determining a frame number of the relay station by using the RS frame offset.

4. The method of claim 3, wherein the message is one of a Subscriber station Basis Capability negotiation-REQuest-ReSPonse (SBC-REQ-RSP) message, a REGistration-REQuest-ReSPonse (REG-REQ-RSP) message, and an RS Configuration CoManD (RS_Config-CMD) message.

5. The method of claim 3, further comprising:
   receiving the broadcast data from the superordinate station through a relay link; and
   transmitting the broadcast message to a Mobile Station (MS) through an access link after waiting for the waiting time.

6. The method of claim 5, wherein the broadcast message is either a TRaFfic-INDication (TRF-IND) message or a PAGing-ADVertisement (PAG-ADV) message.

7. A communication method of a superordinate station in a wireless communication system using a multi-hop relay scheme, the method comprising:
   upon detecting an initial access of a relay station (RS), determining an offset value between a frame number used in the superordinate station and a frame number to be used in the relay station;
   generating a message including RS frame offset information corresponding to the offset value; and
   transmitting the generated message to the relay station.

8. The method of claim 1, wherein the message including the RS frame offset is one of a Subscriber station Basis Capability negotiation-REQuest-ReSPonse (SBC-REQ-RSP) message, a REGistration-REQuest-ReSPonse (REG-REQ-RSP) message, and an RS Configuration CoManD (RS_Config-CMD) message.

9. The method of claim 1, further comprising, upon generating broadcast data to be transmitted at a same time point by both the superordinate station and the relay station, determining a transmission time point, at which the broadcast data is transmitted to the relay station, by using processing delay times of a plurality of relay stations;
   transmitting the broadcast data and a transmission frame number of the superordinate station to the relay stations at the determined transmission time point; and
   transmitting the broadcast data to a Mobile Station (MS) at a frame corresponding to the transmission frame number of the superordinate station.

10. The method of claim 9, wherein the broadcast data is Multicast and Broadcast Service (MBS) data.

11. The method of claim 1, further comprising, upon generating a broadcast message to be transmitted at a same frame number by both the superordinate station and the relay station, determining a transmission time point, at which the broadcast message is transmitted to the relay station, by using frame offsets and processing delay times of a plurality of relay stations;
   transmitting the broadcast message and the transmission frame number to the relay stations at the determined transmission time point; and
   transmitting the broadcast message to a mobile station at a frame corresponding to the transmission frame number.

12. The method of claim 11, wherein the broadcast message is either a TRaFfic-INDication (TRF-IND) message or a PAGing-ADVertisement (PAG-ADV) message.

13. The method of claim 1, wherein the superordinate station is either a Base Station (BS) connected with the relay station or a superordinate RS.

14. A communication method of a Relay Station (RS) in a wireless communication system using a multi-hop relay scheme, the method comprising:
   during an initial access of the relay station, receiving a message including a RS frame offset that indicates an offset value between a frame number used in a superordinate station and a frame number to be used in the relay station; and
   determining a frame number of the relay station by using the RS frame offset.

15. The method of claim 14, wherein the message including the RS frame offset is one of a Subscriber station Basis Capability negotiation-REQuest-ReSPonse (SBC-REQ-RSP) message, a REGistration-REQuest-ReSPonse (REG-REQ-RSP) message, and an RS Configuration CoManD (RS_Config-CMD) message.

16. The method of claim 14, further comprising:
receiving, from the superordinate station, broadcast data and a transmission frame number of the superordinate station for the broadcast data;
determining a transmission time point of the broadcast data by using the RS frame offset and the transmission frame number of the superordinate station; and
transmitting the broadcast data to a Mobile Station (MS) at a frame corresponding to the determined transmission time point.

17. The method of claim 16, wherein the broadcast data is Multicast and Broadcast Service (MBS) data.

18. The method of claim 14, further comprising:
receiving, from the superordinate station, a broadcast message and an RS Transmission (Tx) frame number for the broadcast message; and
transmitting the broadcast message to a mobile station at a frame corresponding to the RS Tx frame number.

19. The method of claim 18, wherein the broadcast message is either a TRaFfic-INDication (TRF-IND) message or a PAGing-ADVertisement (PAG-ADV) message.

20. The method of claim 14, wherein the superordinate station is either a Base Station (BS) connected with the relay station or a superordinate relay station.

21. A superordinate station apparatus in a wireless communication system using a multi-hop relay scheme, the apparatus comprising:
a controller configured to, upon detecting an initial access of a relay station (RS), determine an offset value between a first frame number used in the superordinate station and a second frame number to be used in the relay station;
a message processor configured to generate a message including RS frame offset nformation corresponding to the offset value; and
a transmitter configured to transmit the generated message to the relay station.

22. The apparatus of claim 21, wherein the message is one of a Subscriber station Basis Capability negotiation-REQuest-ReSPonse (SBC-REQ-RSP) message, a REGistration-REQuest-ReSPonse (REG-REQ-RSP) message, and an RS Configuration CoManD (RS_Config-CMD) message.

23. The apparatus of claim 21, further comprising:
a buffer configured to buffer broadcast data to be transmitted at a same time point by both the superordinate station and the relay station,
wherein the controller is configured to determine a transmission time point, at which the broadcast data is transmitted to the relay station, by using processing delay times of a plurality of relay stations, and
wherein the transmitter is configured to transmit to the relay stations the broadcast data and a transmission frame number of the superordinate station at the determined transmission time point, and transmit the broadcast data to a Mobile Station (MS) at a frame corresponding to the transmission frame number of the superordinate station.

24. The apparatus of claim 23, wherein the broadcast data is Multicast and Broadcast Service (MBS) data.

25. The apparatus of claim 21, further comprising:
a buffer configured to buffer broadcast data to be transmitted at a same frame number by both the superordinate station and the relay station,
wherein the controller is configured to determine a transmission time point, at which the broadcast message is transmitted to the relay station, by using frame offsets and processing delay times of a plurality of relay stations; and
wherein the transmitter is configured to transmit a broadcast message and the second frame number to the relay stations at the determined transmission time point, and transmit the broadcast message to a mobile station at a frame corresponding to the second frame number.

26. The apparatus of claim 25, wherein the broadcast message is either a TRaFfic-INDication (TRF-IND) message or a PAGing-ADVertisement (PAG-ADV) message.

27. The apparatus of claim 21, wherein the superordinate station is either a Base Station (BS) connected with the relay station or a superordinate relay station.

28. A relay station (RS) apparatus in a wireless communication system using a multi-hop relay scheme, the apparatus comprising:
a message processor configured to, during an initial access of the relay station, receive a message including a RS frame offset that indicates an offset value between a frame number used in a superordinate station and a frame number to be used in the relay station; and
a controller configured to determine a frame number of the relay station by using the RS frame offset.

29. The apparatus of claim 28, wherein the message is one of a Subscriber station Basis Capability negotiation-REQuest-ReSPonse (SBC-REQ-RSP) message, a REGistration-REQuest-ReSPonse (REG-REQ-RSP) message, and an RS Configuration CoManD (RS_Config-CMD) message.

30. The apparatus of claim 28, further comprising:
a receiver configured to receive, from the superordinate station, broadcast data and a transmission frame number of the superordinate station for the broadcast data,
wherein the controller is configured to determine a transmission time point of the broadcast data by using the RS frame offset and the transmission frame number of the superordinate station.

31. The apparatus of claim 30, further comprising a transmitter configured to transmit the broadcast data to a Mobile Station (MS) at a frame corresponding to the determined transmission time point.

32. The apparatus of claim 30, wherein the broadcast data is Multicast and Broadcast Service (MBS) data.

33. The apparatus of claim 28, further comprising:
a receiver configured to receive,from the superordinate station, a broadcast message and an RS Transmission (Tx) frame number for the broadcast message; and
a transmitter configured to transmit the broadcast message to a mobile station at a frame corresponding to the RS Tx frame number.

34. The apparatus of claim 33, wherein the broadcast message is either a TRaFfic-INDication (TRF-IND) message or a PAGing-ADVertisement (PAG-ADV) message.

* * * * *